R. E. MURPHY.
BEET TOPPER.
APPLICATION FILED DEC. 29, 1908.

1,001,215.

Patented Aug. 22, 1911.

Witnesses:

Inventor
Roy E. Murphy

UNITED STATES PATENT OFFICE.

ROY EMERY MURPHY, OF COLORADO SPRINGS, COLORADO.

BEET-TOPPER.

1,001,215.  Specification of Letters Patent.  Patented Aug. 22, 1911.

Application filed December 29, 1908. Serial No. 469,898.

*To all whom it may concern:*

Be it known that I, ROY EMERY MURPHY, a citizen of the United States, residing at Colorado Springs, in the county of El Paso and State of Colorado, have invented certain new and useful Improvements in Beet-Toppers, of which the following is a specification.

My invention relates to beet topping attachments for mowing machines, in which a serrated cutting knife is made to swing in an arc in a horizontal plane by means of the pitman wheel of a common mower, and the objects of my improvements are; first, to provide a beet topping attachment for ordinary mowers that can be attached or detached easily and quickly, and which utilizes the pitman motion produced by the pitman wheel in conjunction with a pitman and serrated knife, said knife swinging in an arc in a horizontal plane; second, to provide means to hold the tops in position until cut by the serrated knife; third, to provide means to adjust the height of the roller from the ground, and the angle of the knife and vertical distance in or out of the ground, and to afford means to pull the tops into the line of movement of the knife. I attain these objects by the mechanism illustrated in the following accompanying drawings, in which—

Figure 1:
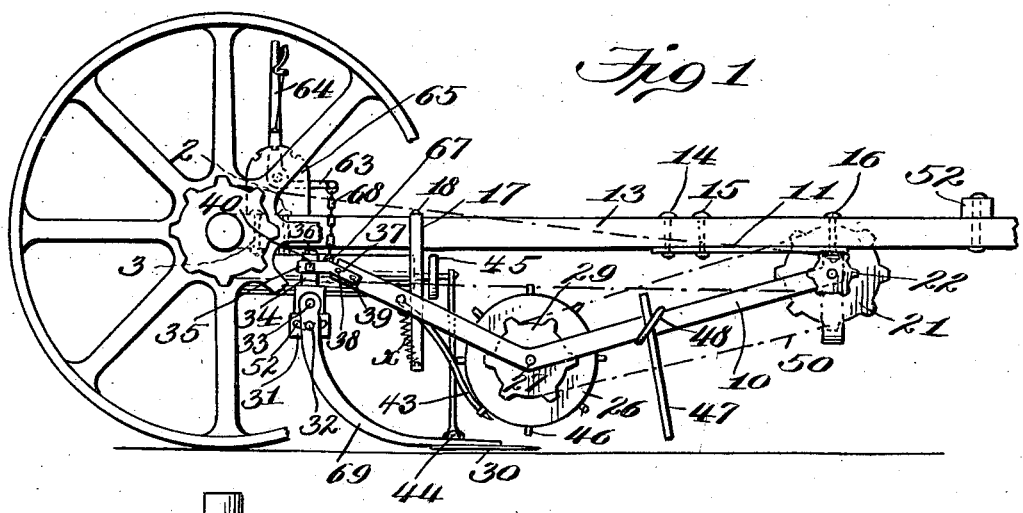
Figure 2:
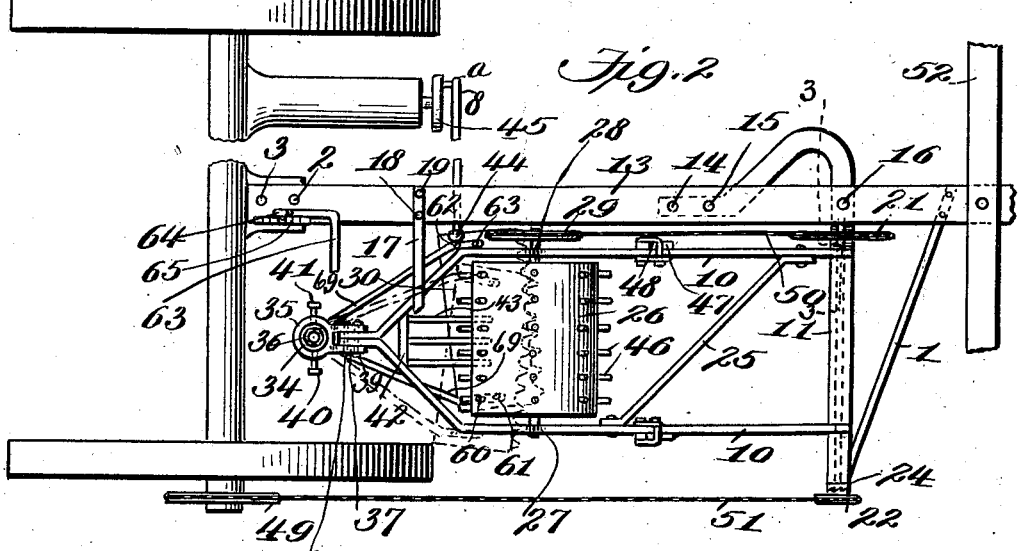
Figure 3:
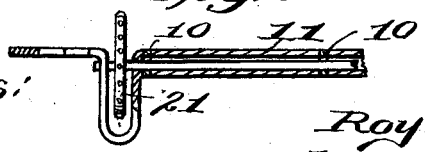

Figure 1 is a side elevation of the entire machine attached to a mower, with the mower wheel 4 partly broken away. Fig. 2 is a top view of the machine attached to the mower with parts of the mower broken away. Fig. 3 is a sectional detail on the line 3—3 of Fig. 2.

Similar figures refer to similar parts throughout the drawings. The side frames 10 are hinged at their front ends to a supporting arm 11 which is bolted to the tongue 13 by means of the bolts 14, 15 and 16 and further strengthened by a brace iron 1, and the rear ends of the frames 10 are guided or held in position by a guide arm 17 which is bolted to tongue 13 by means of the bolts 18 and 19. A shaft runs through arm 11 and has at its outer end a ratchet 24 and a sprocket 22 and at its opposite end a sprocket 21. 25 is a brace between the bars 10. 64 is a bent lever pivotally secured to the rear end of the tongue by a bracket 65. 68 is a chain connected to the lower end of the lever and to the loop iron 37 at 67. A spiked roller 26 is located within and has its bearings in frame 10, at 27 and 28 and is provided with a sprocket 29 at its inner end outside of the frame 10.

The serrated knife 30 has its cutting edge in a line back of the center of roller 26 and is adjustably secured to arms 69 by bolts 60, 61, 62, 63, and the arms adjustably secured to a block 31 by bolts 32 and 33. Block 31 is provided with an upwardly extending pivot 34, which works in the boxing 35 and is held in position by the nut 36 on the upper end of the pivot. Boxing 35 is secured to the frame 10 by means of loop iron 37 and bolts 38 and 39. The loop iron 37 is provided with threaded holes which receive set screws 40 and 41 by means of which the boxing 35 is held in place when they are tight but may be moved up or down when they are loosened. 17 is a guide arm bolted to tongue 13 by bolts 18 and 19 which holds the frame in proper position, but permits frame 10 to move up or down so that it will adjust itself to the unevenness of the ground or may be raised over obstructions. The cross piece 42 at the rear of the frame 10 is provided with prongs 43, which press against the roller 26 between the spikes 46 and prevent the tops or trash from winding around the roller 26, and allow the tops to pass over the knife and drop on the ground.

The pitman 8 is attached to the pitman wheel 45 in the ordinary way at *a* and is connected to the knife 30 at 44 by a ball and socket joint. A bar 47 is clamped to each side bar 10 by a clamp 48. Sprocket 49 is secured to the hub of the mower wheel 4 by bolts or otherwise. 51 and 50 are chain belts connecting sprockets 49 and 22 and 21 and 29 respectively. 52 is a common double tree partly broken away at each end.

The whole machine operates as follows: The tongue, sickle bar, and pitman of the mower are removed from the common mower and the tongue of my attachment is bolted to the mower by means of the bolts 2 and 3 and the pitman is secured to pitman wheel 45 by the ordinary methods. The knife 30 is adjusted by means of bolts 32 and 33 and the slot 52. Bolt 33 remains fixed and bolt 32 is moved in the slot 52 in block 31. When in the desired position the screw 32 is tightened, and a wedge may be placed in the recess 52 behind the frame 69, thus preventing the parts slipping backward. The knife 30 is also adjusted with respect to depth by raising or lowering the loop iron 37. When it is in the desired position the set screws 40 and 41 are tightened, thereby holding the parts as set. The mechanism is lowered by means of lever 64. The machine is now drawn forward so that the middle of the roller runs over the row of beets. The sprocket 49 secured to the drive wheel of the mower revolves, driving by means of the chain 51, the sprocket 22, which being on the same shaft as sprocket 21, causes sprocket 21 to revolve, which in turn drives the sprocket 29 by means of the chain 50. Sprocket 29 being on the same shaft as roller 26 revolves the same, causing the spikes 46 to rake the beet tops under the roller 26 and over the knife 30, the roller being geared up to the proper relative speed. Simultaneously the pitman wheel 45 revolves, swinging the knife 30 by means of the pitman 8 to and fro as shown by the dotted lines in Fig. 2. Knife 30 is provided with a serrated edge which makes a clean cut. The prongs 43 pressing between the spikes 46 keep the tops and trash from winding around the roller and clogging, but allow the tops to pass over the knife, leaving them on the ground.

A spring $x$ is provided extending from the bottom of brace 17 to the frame 10 to hold the knife and roller more firmly against the work.

I claim:

1. In a beet topper, the combination of a wheeled frame, a vertical bearing box mounted on said frame, a pivot located in the box and having arms projecting downwardly and forwardly therefrom, a knife attached to the front end of the arms, and means to swing the knife.

2. In a beet topper, the combination with a vertical bearing and a pivot arranged to turn therein, of a knife provided with supporting arms connected to the lower end of the pivot, said connection being adjustable to vary the angle of the knife, and means to swing the knife.

3. In a beet topper, the combination with a vertical bearing and a pivot therein, of arms pivotally connected to the lower end of said pivot and extending downwardly and forwardly therefrom, means to hold the arms at adjustment, a knife carried by the front ends of the arms, and means to operate the knife.

4. In a beet topper, the combination with a wheeled frame having a tongue, a support projecting from said tongue on one side thereof, a frame hinged at its front end to said support and arranged to swing up and down at its rear end, means to raise and lower said hinged frame, and topping devices carried by said frame.

5. In a beet topper, the combination with a supporting frame, of a vertical bearing box adjustably mounted thereon, a pivot supported in said box, arms projecting forwardly from the lower end of said pivot, a knife attached to the front ends of the arms, and means to swing the knife.

6. In a beet topper, the combination with a main wheeled frame, of a frame hinged at its front end thereto, a guide arm projecting from the main frame and depending beside the rear end of the hinged frame, a spring connecting said frame and said arm and tending to lower said frame, a lifting lever mounted on the main frame and connected to the hinged frame, and topping devices carried by the rear end of said hinged frame.

7. In a beet topper the combination of a frame having opposite side bars, a spiked roller mounted between the bars, a knife carried by the frame and movable under the roller, and arms projecting from the side bars and adapted to guide the tops to the roller.

In testimony whereof, I affix my signature in presence of two witnesses.

ROY EMERY MURPHY.

Witnesses:
 Roxy Fraker Murphy,
 John Dietrich.

---

Copies of this patent may be obtained for five cents each, by addressing the "Commissioner of Patents, Washington, D. C."